United States Patent
Keast (10) Patent No.: US 12,533,192 B2
(45) Date of Patent: Jan. 27, 2026

(54) SURGICAL ASSISTANT SYSTEM BASED ON IMAGE DATA OF THE OPERATIVE FIELD

(71) Applicant: Broncus Medical Inc., San Jose, CA (US)

(72) Inventor: Thomas M. Keast, Sunnyvale, CA (US)

(73) Assignee: Broncus Medical Inc., San Jose, CA (US)

(*) Notice: Subject to any disclaimer, the term of this patent is extended or adjusted under 35 U.S.C. 154(b) by 579 days.

(21) Appl. No.: 17/973,661

(22) Filed: Oct. 26, 2022

(65) Prior Publication Data

US 2023/0143522 A1   May 11, 2023

Related U.S. Application Data

(60) Provisional application No. 63/276,393, filed on Nov. 5, 2021.

(51) Int. Cl.
*A61B 34/20* (2016.01)

(52) U.S. Cl.
CPC ...... *A61B 34/20* (2016.02); *A61B 2034/2057* (2016.02); *A61B 2034/2065* (2016.02)

(58) Field of Classification Search
CPC ............ A61B 34/20; A61B 2034/2057; A61B 2034/2065; A61B 1/042; A61B 1/2676; A61B 90/98; A61B 90/96; A61B 2017/00207; A61B 2034/105; A61B 2034/2051; A61B 2090/365; A61B 2090/371; A61B 2090/376
USPC ......................................................... 382/128
See application file for complete search history.

(56) References Cited

U.S. PATENT DOCUMENTS

| | | |
|---|---|---|
| 6,491,702 B2 * | 12/2002 | Heilbrun ............... G06T 7/33 348/E13.016 |
| 6,947,788 B2 | 9/2005 | Gilboa et al. |
| 7,756,316 B2 | 7/2010 | Odry et al. |
| 7,756,563 B2 | 7/2010 | Higgins et al. |
| 7,889,905 B2 | 2/2011 | Higgins et al. |
| 9,265,468 B2 | 2/2016 | Rai et al. |
| 9,693,748 B2 | 7/2017 | Rai et al. |
| 10,529,088 B2 | 1/2020 | Fine et al. |
| 10,580,147 B2 | 3/2020 | Liu et al. |
| 11,464,581 B2 * | 10/2022 | Calloway ............. G06T 19/006 |
| 2008/0183073 A1 | 7/2008 | Higgins et al. |

(Continued)

FOREIGN PATENT DOCUMENTS

WO    WO-2021127426 A1 *   6/2021    ......... A61B 1/00103

OTHER PUBLICATIONS

Eleni Theodoridou et al., Hand Tracking and Gesture Recognition by Multiple Contactless Sensors: A Survey, IEEE Transactions on Human-Machine Systems (2022).

(Continued)

*Primary Examiner* — Neil R Mclean
(74) *Attorney, Agent, or Firm* — Batt IP A Law Corporation; Richard Batt (57) ABSTRACT

A method and system for assisting a physician compute the 3D location of the tip of a surgical device inserted into a patient is described. A trained model computes the 3D location of the hidden portion of the surgical device based on live image data of the operative field. A display shows the tip of the surgical device and a 3D model of the body organ in a fused arrangement.

19 Claims, 6 Drawing Sheets

(56) References Cited

U.S. PATENT DOCUMENTS

2012/0289825 A1\* 11/2012 Rai ........................ A61B 6/547
                                                        600/425
2015/0366620 A1   12/2015 Cameron et al.
2021/0298590 A1\*  9/2021 Ayvali ................... A61B 34/30

OTHER PUBLICATIONS

International Search Report and Written Opinion for PCT/US22/78677, mailed Jan. 31, 2023.

\* cited by examiner

SURGICAL ASSISTANT SYSTEM BASED ON IMAGE DATA OF THE OPERATIVE FIELD

CROSS-REFERENCE TO RELATED APPLICATIONS

This application claims priority to provisional application No. 63/276,393, filed Nov. 5, 2021, entitled "SURGICAL ASSISTANT SYSTEM BASED ON IMAGE DATA OF THE OPERATIVE FIELD."

FIELD OF THE INVENTION

The present invention relates to surgical procedures and in particular, to assisting physicians with tracking and guidance during bronchoscopy-based surgical procedures.

BACKGROUND OF THE INVENTION

Minimally invasive surgery is surgery performed with only a small incision or no incision at all and is typically performed with an endoscope, bronchoscope, laparoscope, or like instrument.

In a bronchoscopic procedure, for example, a bronchoscope is inserted through the nose or mouth of the patient, advanced through the trachea and into a desired airway. The surgery may then be performed through the working lumen of the bronchoscope. A light source and camera at the tip of the bronchoscope enables the physician to observe the airway wall in real time. A skilled physician can identify their location along the airway and navigate to the desired location along the airway wall.

It is often desirable, however, to supplement endoscopic visualization with radiological guidance (e.g., by taking real time X-ray images of the region with a fluoroscope). In certain procedures radiologic guidance is necessary.

In a transbronchial needle aspiration (TBNA) procedure, for example, a long flexible catheter comprising a needle at the tip is advanced through the working lumen of the bronchoscope to the target site. In sampling lymph nodes, an ultrasound equipped scope (e.g., an endobronchial ultrasound (EBUS)-type bronchoscope) can be used to visualize the needle entering the lymph node in close proximity to the airway wall. For other targets, or if an EBUS scope is not available, a standard bronchoscope can be used. If desired, the needle is advanced through the airway wall outside of view of the bronchoscope to aspirate a sample of tissue. It is highly desirable or necessary to have fluoroscopy or an alternative means to view and track the needle once it is outside of view of the bronchoscope or ultrasound vision.

Locating or tracking the location of devices inside the patient using a fluoroscope, however, is not straightforward. To track a device, multiple 2D X-ray images from at least two different fluoroscopic camera views are taken. Based on the information provided by these two images, the physician determines the position of the device. Determining the position based on two 2D X-rays relies on the skill and experience of the physician. Even for the most skilled physicians there is a considerable degree of uncertainty. This is undesirable.

One approach to address the above-mentioned problem is described in U.S. Pat. No. 6,947,788 to Gilboa. According to the Abstract, "[a] catheter, including: a housing having a transverse inner dimension of at most about two millimeters; and a coil arrangement including five coils and five solid cores. Each of the coils is wound around one of the solid cores. The coils are non-coaxial. The coil arrangement is mounted inside the housing." The different sensors are used for sensing different components of an electromagnetic field. A controller/processor implements an algorithm to infer the position and orientation of probe. A drawback to the technique described in Gilboa, however, is the requirement of setting up an electromagnetic field system in the operating room.

Another approach to address the above-mentioned problem is described in U.S. Pat. No. 9,265,468 to Rai. According to the Abstract, "[a] method for assisting a physician track a surgical device in a body organ of a subject during a procedure includes fluoroscopic based registration, and tracking. An initial registration step includes receiving a 3D image data of a subject in a first body position, receiving a real time fluoroscopy image data, and estimating a deformation model or field to match points in the real time fluoro image with a corresponding point in the 3D model. A tracking step includes computing the 3D location of the surgical device based on a reference mark present on the surgical device, and displaying the surgical device and the 3D model of the body organ in a fused arrangement." A drawback to the technique described in Rai, however, is the reliance on x-ray imaging. It is desirable to limit the use of x-ray imaging.

Notwithstanding the above, a method and system to assist surgeons track surgical devices in a body organ such as the lung and that does not suffer the above identified drawbacks is therefore desired.

SUMMARY OF THE INVENTION

A bronchoscopic method for assisting a physician determine the location of the working end of a medical apparatus or device inserted into a patient is based on live images of the operative field during the procedure. The location is calculated relative to a 3D model of the organ, wherein the 3D model of the organ is derived from pre-acquired 3D image data of the patient. Amongst other things, an advantage of the invention is to detect when the device is over or underextended and to notify the physician of same.

In embodiments the medical apparatus or device is selected from the group consisting of a bronchoscope, EBUS, RF ablation catheter, vapor ablation catheter, valve delivery catheter, stent delivery catheter, marker delivery catheter, rigid probes, and biopsy or aspiration needles. Optionally, the medical device may contain markers that can signify distance from the tip of a delivery apparatus.

In embodiments, multiple devices are operable together and the locations of the multiple devices are computed in 3D space or body organ of the patient. Examples of multiple devices operating together include, without limitation, a vapor ablation catheter may be advanced through the working lumen of the bronchoscope or a TBNA advanced through the working lumen of an EBUS.

In embodiments, in addition to the location of the device, the invention can compute or estimate the shape, curvature, or deformation of the device as well as components or features of the device such as, e.g., its head, feet, or arms.

In embodiments, the method includes initially detecting the type of device, namely, classifying and locating the device (or a portion of the device) within an image of the operative field. In embodiments, a trained device detection algorithm or model is employed to perform this step. In an embodiment, the device detection model is a CNN trained on a plurality of different surgical devices.

Optionally, the system can show on the screen the scene, which device is present in the scene, and whether a device is being used in an application. Preferably, the system can indicate whether a device is in an undesirable pose, or use scenario, e.g., if the device is off track by a threshold distance the system can provide an alert. Examples of alerts include audio and/or visual alerts.

In embodiments, the device (or a portion of the device) is tracked over real time or over multiple sequential images of the operative field.

In embodiments, the location of the hidden working end or tip of the device is computed relative to the 3D model of the organ based on the output from the detecting step, tracking step, and optionally, other input information available during the procedure such as input from the physician as well as scope or fluoro images.

In embodiments, the 3D location of the hidden tip of the device is computed using a model (preferable a neural network or CNN) selected from a plurality of trained models. In embodiments, a library or storage unit contains a trained model for each type of device. For example, the library may contain separate trained models for each of a bronchoscope, catheter, and TBNA. In embodiments, a unique trained model is created and stored for each device product number.

In embodiments, the user can refine the model. In embodiments, for example, the user and co-pilot register/sync the location of the scope or device with a landmark or otherwise known anatomical feature in the lung of the patient during the live procedure. Several points can be synced as the user advances the scope or device along the planned route. Each synced point can act as a breadcrumb to assist in the model. In embodiments, each synced point is used as input to the model to limit the model to a specific region of the lung, serving to increase the accuracy and/or speed of finding a solution.

In embodiments, after the location is computed, the image of the device (or a portion of the device) is overlaid or fused with the image of the organ. In embodiments, an image generator or rendering engine is operable to provide an augmented reality type view. A model of the device and instruments can be overlaid onto a fluoro, virtual, or live Bronchoscopic view. A benefit of the invention is to provide positioning guidance to improve planning for treatments such as, e.g., RF ablation and optimal/complete coverage of the lesion.

A bronchoscopic fused view serves to assist in approach and advancement once behind the airway wall. Additionally, such views could reduce the number of fluoro views taken during a procedure. For example, a single shot of fluoro at a first angle could be aided by a fused view in order to adjust the angle of approach without taking a second shot of fluoro at a second angle.

In embodiments, a 3D model of the organ is displayed with the device overlaid in the image at its computed location. In embodiments, the system is configured to allow the user to adjust the transparency of the organ relative to the device, zoom, and viewing angle.

In embodiments, a system for assisting a physician determine the location of the hidden working end of a medical apparatus or device inserted into a patient is based on live images of the operative field during the procedure.

In embodiments, the system includes a detector module, tracking module, and a device tip or end location computation module for computing the 3D location of the hidden working end of the device.

In embodiments, the system includes a library of trained models—one for each type of device.

In embodiments, the system further includes a fusion module operable to superimpose the device with the organ in the 3D or 2D view and to display the augmented image.

The description, objects and advantages of the present invention will become apparent from the detailed description to follow, together with the accompanying drawings.

DETAILED DESCRIPTION OF THE INVENTION

Before the present invention is described in detail, it is to be understood that this invention is not limited to particular variations set forth herein as various changes or modifications may be made to the invention described and equivalents may be substituted without departing from the spirit and scope of the invention. As will be apparent to those of skill in the art upon reading this disclosure, each of the individual embodiments described and illustrated herein has discrete components and features which may be readily separated from or combined with the features of any of the other several embodiments without departing from the scope or spirit of the present invention. In addition, many modifications may be made to adapt a particular situation, material, composition of matter, process, process act(s) or step(s) to the objective(s), spirit or scope of the present invention. All such modifications are intended to be within the scope of the claims made herein.

Methods recited herein may be carried out in any order of the recited events which is logically possible, as well as the recited order of events. Furthermore, where a range of values is provided, it is understood that every intervening value, between the upper and lower limit of that range and any other stated or intervening value in that stated range is encompassed within the invention. Also, it is contemplated that any optional feature of the inventive variations described may be set forth and claimed independently, or in combination with any one or more of the features described herein.

All existing subject matter mentioned herein (e.g., publications, patents, patent applications and hardware) is incorporated by reference herein in its entirety except insofar as the subject matter may conflict with that of the present invention (in which case what is present herein shall prevail).

Reference to a singular item, includes the possibility that there are plural of the same items present. More specifically, as used herein and in the appended claims, the singular forms "a," "an," "said" and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation. It is to be appreciated that unless defined otherwise, all technical and scientific terms used herein have the same meaning as commonly understood by one of ordinary skill in the art to which this invention belongs.

Figure 1:
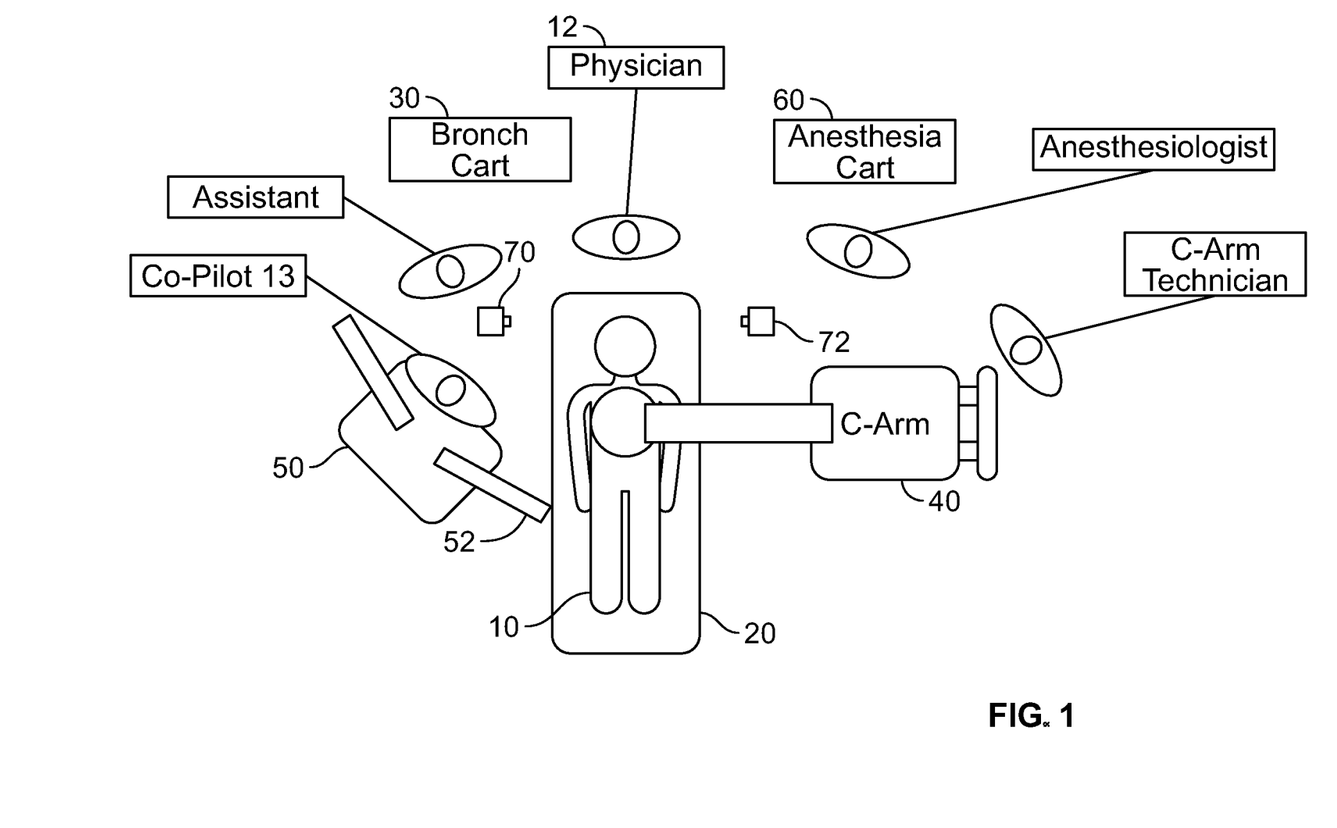
FIG. 1 is a schematic diagram of a subject on a table during a bronchoscopic procedure.

FIG. 1 illustrates a schematic diagram of a surgical setting in an operating room in accordance with an embodiment of the present invention. In particular, FIG. 1 illustrates a subject 10 on an operating table 20. Although the subject shown in FIG. 1 is a human, the invention is applicable to animals other than humans and may be performed on live or dead animals or subjects as the case may be.

The operating room shown in FIG. 1 includes a bronchoscopy cart 30, fluoroscope 40, tracking workstation cart 50, anesthesia cart 60, and a plurality of cameras 70, 72 aimed at the operative field.

Bronchoscopy cart 30 may include a monitor and console for the bronchoscope (not shown) for the physician 12 to manipulate.

A fluoroscope 40 takes real time fluoroscopic video of the subject. Video frames of the video or images can be collected or received by workstation 50 for processing. Real time images may also be displayed on a video monitor 52.

Workstation 50, as will be described in more detail below, is configured to receive the images from one or more of the bronchoscopes, the fluoroscope, and cameras 70, 72 in real-time and to compute the 3D location of the bronchoscope or a surgical device advanced through the working channel of the scope as described herein. Additionally, multiple cameras could be arranged throughout the operating room to obtain a complete profile (e.g., 360-degree profile) of the chest. The images can be combined by a processor to generate a 3D model of the chest and determine breathing level, and monitor breathing level. Preferably, the display 52 shows a plurality of images. As will be described in greater detail herein, workstation 50 is configured to send to the display a number of types of images including 3D model views, 2D model fluoroscopy views, real fluoroscopy views, real endoscopic views, model endoscopic views, and a wide range of information superimposed on the views such as, without limitation, planning information, region of interests, virtual target markers, vessels, virtual obstacles, real devices, virtual devices, routes to a target, notes/annotations and indicia provided by the user, etc.

The workstation 50 shown in FIG. 1 registers the observed real-time location of the surgical device with the 3D location in a 3D model of the subject. As described herein, the information and location may be displayed in a number of ways to the physician to assist tracking the surgical device in real time, and in the event planning information has been provided to the workstation, to guide the physician to a target. Various planning information may be provided or determined by the workstation as described in U.S. Patent Application No. 2008/0183073 to Higgins et al., for example.

Figure 2A:
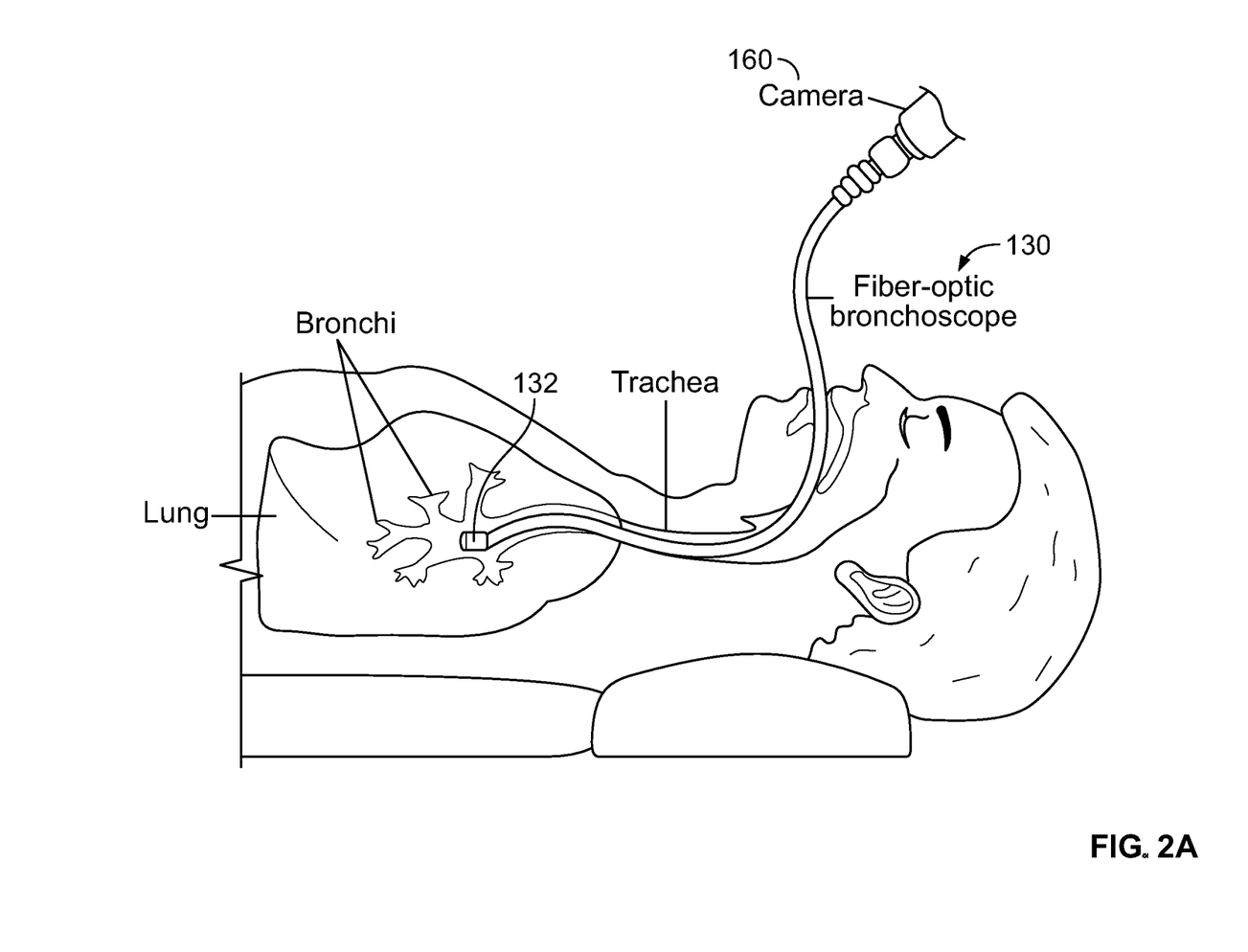
FIG. 2A is an illustration of use of a bronchoscope on a subject.

With reference to FIG. 2A, a bronchoscope 130 is shown positioned and extending into a lung of the subject. The bronchoscope 130 has a distal working end or tip 132 which has been passed through the subject's mouth, the trachea, and into the lung.

Figure 2B:
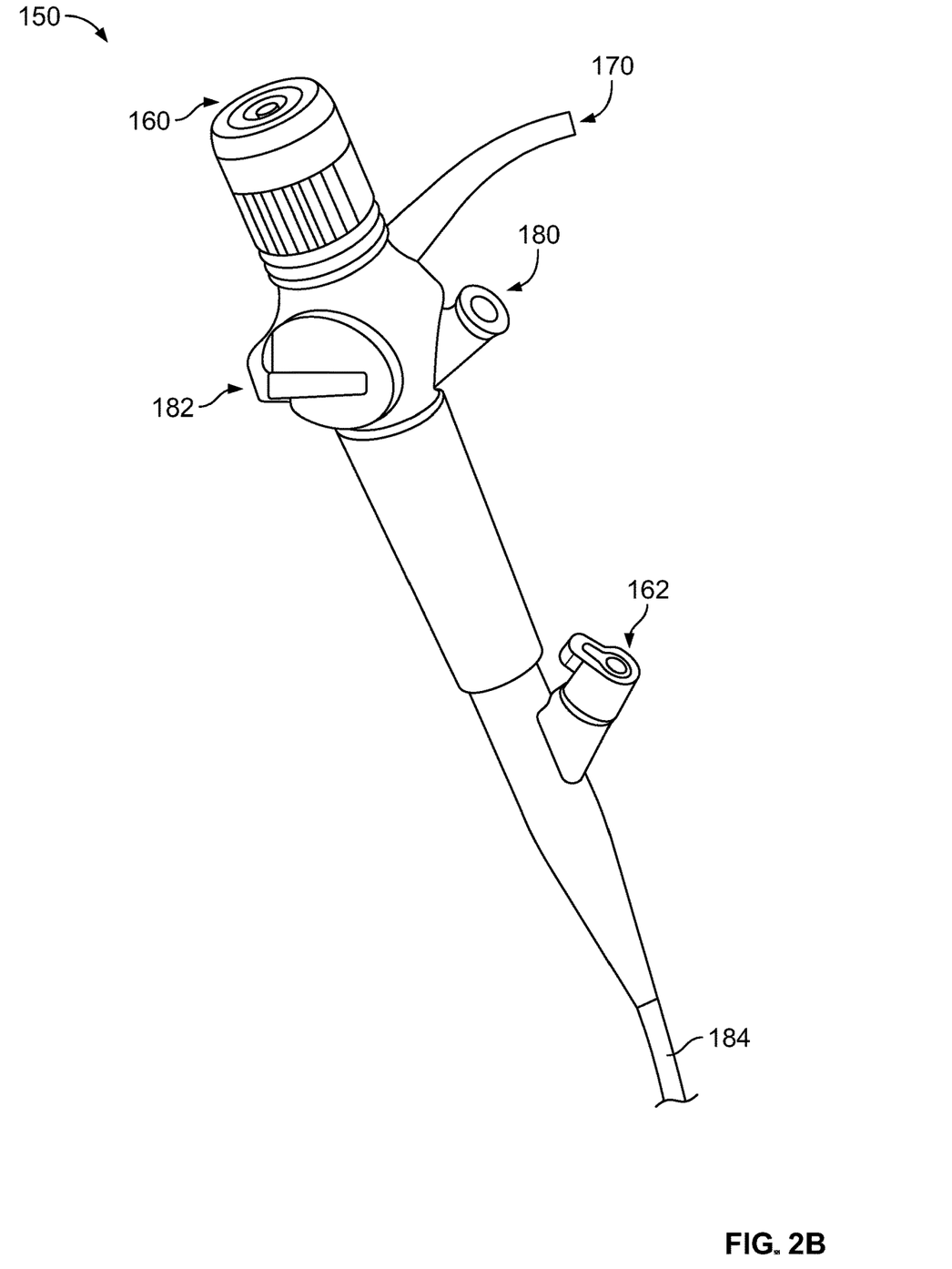
FIG. 2B is an enlarged view of a handle portion of a typical bronchoscope.

FIG. 2B illustrates an enlarged view of a handle portion 150 of a bronchoscope. The handle 150 is shown including various features such as without limitation an eyepiece 160, working channel connector 162, cable connector for light 170, suction connector 180, control knob 182, and markers 184. For example, visible markers may present as lines every 100 mm along the shaft. The number of markers visible or inserted can indicate how deep the shaft has been inserted into the patient.

In a procedure, a surgical device may be advanced through the working channel 162. The surgical device may be selected from a wide range of types of devices, instruments, implants, and markers which, preferably, are visible under fluoroscopy. Examples of surgical devices include, without limitation, catheters, sheaths, needles, ablation devices, stents, valves, fiducial markers, seeds, coils, etc.

Figure 3:
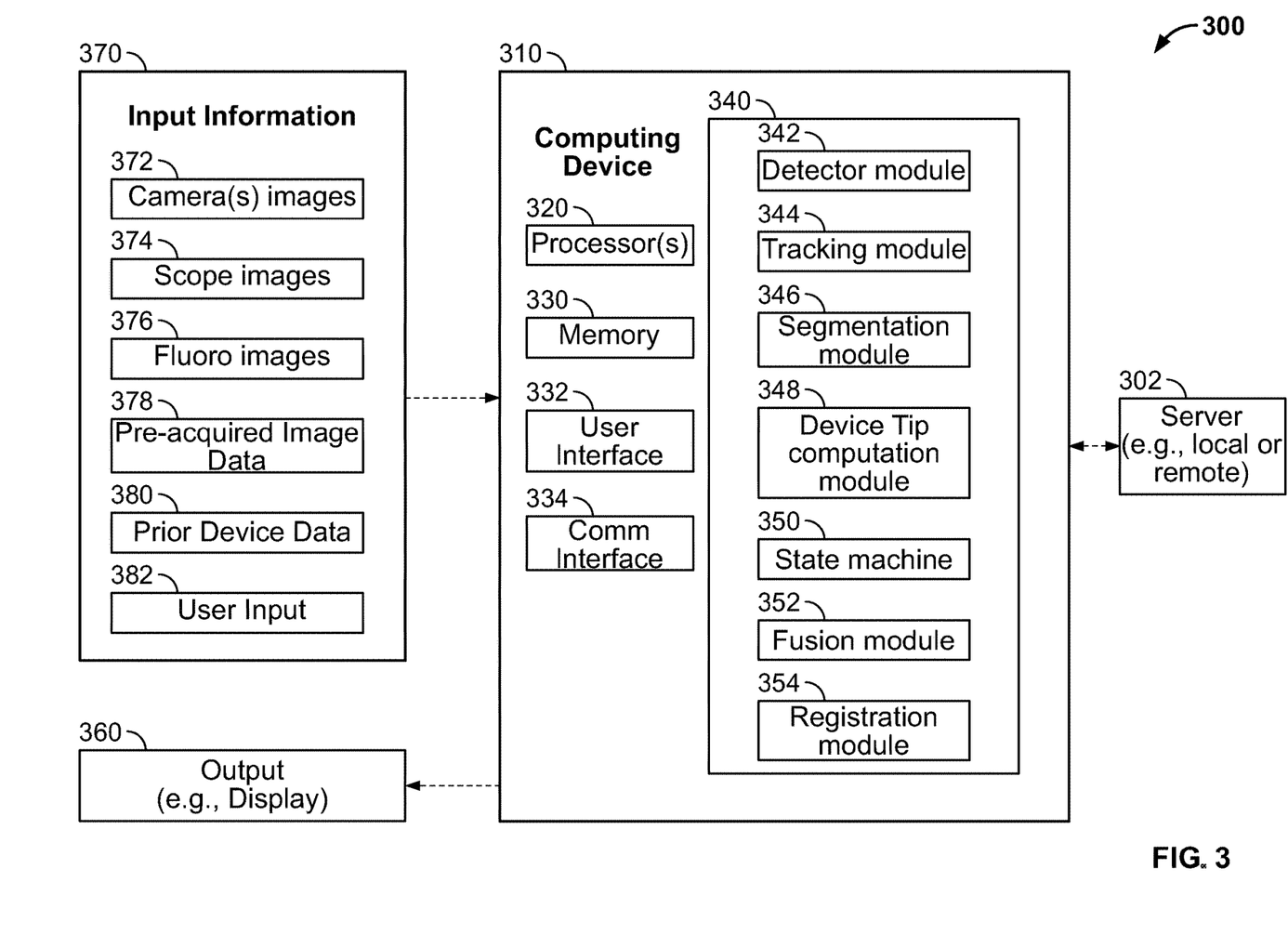
FIG. 3 is a block diagram of a bronchoscopy assistance system in accordance with an embodiment of the present invention.

FIG. 3 illustrates a tracking system 300 in accordance with an embodiment of the invention including a workstation or specially programmed computing device 310. The workstation 310 shown in FIG. 3 includes at least one processor 320 operable to determine the 3D location of the surgical device in real time based on, amongst other things, the real-time images from the cameras and other inputs as will be described in more detail herein.

Memory

Workstation 310 is also shown having a memory device 330 which holds or stores information including programs, as well as imaging, device, and procedural data. The memory device may be solid state memory device or a hard drive, for example.

In another embodiment the processor is connectable to a memory device through the internet or through another communication line to access a network. For example, patient data CT scans may be stored on a server of a hospital and the processor of the instant application is adapted to access such data via a communication line and process the data. It is to be understood, however, that although the system in FIG. 3 is shown with a memory 330 for receiving and storing various information the invention is not so limited. In an alternative embodiment the system may be configured to merely access a memory device such as a USB stick, a CD, or other media storage device.

The workstation 310 shown in FIG. 3 receives various input information 370 via, for example, a user interface 332 (e.g., keyboard), comm interface 334 (e.g., near or far wireless card, landline card, etc.) or ports or connectors (e.g., USB port, video port, etc.). A frame grabber card or equivalent is present to capture individual video frames or images for processing. Real time images may be obtained by the workstation 310, for example, from the continuous camera image data, scope video, fluoroscopy video, video clips, and/or still frames, discussed herein.

An example of a workstation is a Dell Computer Model No. 7820 XL with Dual Intel Xeon Gold 3.0 GHz Processor and a Nvidia Quadro RTX4000 video card.

The input information shown in the embodiment in FIG. 3 includes camera images 372, scope images 374, fluoro images 376, pre-acquired image data 378, prior device data 380, and user input 382. It is to be understood that the input information 370 may vary widely and the invention is only intended to be limited as recited in the appended claims.

Examples of cameras include visible light spectrum cameras such as RGB cameras. A suitable model is Hero10, manufactured by GoPro (San Mateo, CA). The cameras may be mounted around the operating table, to robotic controlled arms, added to the surgeon headlamp, or otherwise distributed around the operating table and aimed towards the head and chest area of the patient. Cameras can be located on the workstation 50 or the fluoroscope 40. Cameras are preferably aimed from different angles. In the event one camera view is obstructed, another camera may still capture the desired image of the operative field. Cameras can also be infrared cameras to operate in the low light of the operative field similar to night vision cameras for home security.

Examples of scopes include bronchoscopes such as model BF-H190, manufactured by Olympus (Tokyo, Japan).

Examples of fluoroscopes include model OEC 9900, manufactured by GE Healthcare (Chicago, IL).

Additional external sensors can include a camera tracking sensor and associated tools (e.g., one or more markers can be placed on each of the cameras, patient, or patient board if present, not shown). A camera tracking sensor is operable and programmed to track the location of the fluoroscope, cameras, and other tools including devices and instruments. Input information can include the camera(s) location information. The camera and tool location information can be used for performing the registration and tracking. An example of an external sensor is the Polaris Spectra or Vega tracker, both of which are manufactured by NDI in Waterloo, Ontario, Canada.

The workstation is further adapted to send image data to a display 360 using a video card.

Display

The system 300 shown in FIG. 3 also includes a display 360 which may present reports, data, images, results and models in various formats including without limitation graphical, tabular, and pictorial form. In one embodiment of the present invention, a virtual surgical device is superimposed on a 3D model of the organ.

The displays may be incorporated with the processor in an integrated system (e.g., a lap top, or larger pad-type computer) or the displays may cooperate with the processor from a remote location. A processor may be adapted to send or deliver data across a network to one or more displays, tablet computers, or portable computer devices or smart phones such as the Iphone® manufactured by Apple, Inc. Cupertino, CA, United States. Indeed, although the computer system 300 shown in FIG. 3 includes a number of various components incorporated into a system, the invention is not so limited. The invention is intended to be limited only as defined in the appended claims.

Input Device

The system 300 shown in FIG. 3 also includes a user input device 382 such as, for example, a keyboard, joystick, or mouse. The user input device allows a user such as the physician to add or input data and information as well as modify planning information and to make notes in the files and records. The input device may also adjust the display views (e.g., zoom, scroll, measure, save, send, etc.)

Software

FIG. 3 also shows various software 340 which are computer readable instructions stored on a storage or memory device to carry out various steps for tracking the bronchoscope and optionally surgical device advanced through the bronchoscope in accordance with embodiments of the invention. Each module may be configured as a program stored on the memory 330 or alternatively, may be configured as a card or printed circuit board having its own separate memory and processor.

A detector module 342 is operable to detect and locate an object in the operative field based on the input information including images from the cameras 372. In embodiments, the detector module includes a trained model for detecting and locating a wide range of objects including but not limited to anatomical features of the patient and the surgeon, scope features, and surgical device features. Detector module can also detect location features added to other objects such as reflective stickers, shapes or other marking items applied prior to device use. These detection markers could be applied during training or during field registration to aid detection. These could also be placed on the patient anatomy during the procedure similar to the use of motion capture biomechanical suits.

Anatomical features can include without limitation the patient's chin, ear, sternoclavicular joint, and base of nose, as well as the surgeon's hand, digits (namely, thumb, fingers), knuckles, and arm. These could have enhanced detection by application of a detection marker, described above. Anatomical features can also be registered or monitored through motion such as breathing to detect and register the displacement of the ribs and chest cavity with breathing motion.

Scope features can include without limitation eyepiece, cable for light source branch, control lever, camera buttons, suction channel hub, catheter or surgical device hub, ET tube, scope adapter, length of scope visible (unburied), markers and other visible structures on the bronchoscope handle and shaft. Scope features can also include features highlighted or marked by the markers/stickers, described above.

Surgical device features can include without limitation the handle, actuation knobs or buttons, hubs, length of device visible (unburied), and indicia or logos. Surgical device features can also include features highlighted or marked by the markers/stickers, described above, all of which may be calibrated as part of the system library.

Input information may include model and model number, specifications of the scope or surgical device including, for example, the total length, diameter, shape, and other features that may be useful in facilitating detection of objects in the field of view of the cameras.

Additionally, as discussed further herein, prior device data and/or profiles of the devices can be stored in a library in the memory 330. Each type of device can have a unique known profile including, for example, model identifier, the total length, diameter, shape, and other features that may be useful in facilitating detection and tracking the device in the field of view of the cameras. Design or CAD files may be associated with the device profile. The profiles may also include specific/desirable registration views, marker placement, and procedures for each type of device or, in the case such a profile or file does not yet exist, an instruction or command to prompt the user for creation of a new device file with specific registration view and procedures for the particular device. For example, the library may comprise a device file for each of a traditional bronchoscope, EBUS, RF ablation catheter, vapor ablation catheter, TBNA, and stent or valve delivery catheter. Optionally, the library may comprise a file for each type of marker, tool, and sticker (or similar indicia) added onto the devices for assisting in location.

An example of a trained detector model is a Region-based Convolutional Neural Network (R-CNN) trained on the above-described objects. However, other types of machine learning, neural network, or more generally computer vision models can be trained to classify and locate (namely, detect) the above-described objects in the operative field.

A tracking module 344 is operable to track the detected objects in the operative field. In embodiments, the tracking module tracks the object after it is detected and provides a score or confidence level of the object movement. For example, the tracking module can compute and store the forward motion (e.g., time 1, forward, 5 mm, 95%) and rotation motion (e.g., time 3, CCW, 30 degrees, 75%) of the scope, and can feed this motion data into the device tip computation module 348, discussed herein. Examples of tracking techniques include without limitation optical flow, Kalman filtering, Kanade-Lucas-Tomashi (KLT) feature tracker, and mean shift tracking.

Segmentation module 346 is operable to compute the 3D geometry of the organs and target tissue based on the pre-acquired image data. In embodiments, 3D or 4D image data of the lung of the patient is provided and the segmentation module computes a 3D model of the airway and optionally a target tissue such as a tumor to be interrogated, sampled or removed. The 3D model of the body organ is created from input including available image data from the subject such as, for example, high resolution computed tomography (HRCT) scans. Other acceptable data sets include without limitation MRI, PET, 3D angiographic, and X-ray data sets. In a method, or system, the workstation receives a 3D image file, 3D image data set, or a set of 2D images of the organ from which a 3D model of the organ may be computed. In embodiments, the workstation may communicate with a device using DICOM, for example, to receive such data sets. An exemplary technique to determine a 3D model of the body organ is disclosed in U.S. Pat. No. 7,756,316 entitled "Method and system for automatic lung segmentation". See also, U.S. Pat. Nos. 7,889,905 and 7,756,563; and Patent Publication No. 2008/0183073 all to Higgins et al.

A model (e.g., a 3D model) of the devices and bronchoscope may be generated based on their stored or input profiles, discussed herein.

Registration module 354 is operable to register the 3D model of the organ computed from the segmentation module with the actual or real time position of the organ.

An exemplary type of registration is location-based. Location-based registration requires the user to go to a known location under fluoroscopy and registration is performed based on the known location or anatomical landmark. For example, the device may be moved to the main carina by the physician 12 and the 3D model image is matched to the 2D fluoro image at this known location by the co-pilot 13. Examples of registration techniques are described in U.S. Pat. Nos. 7,756,563; 7,889,905; 9,265,468; and 10,580,147.

Calibration of the internal camera/sensor parameters as well as calibration of the coordinate systems to one another (e.g., live patient space, 3D model space, fluoro camera space, and visible spectrum camera space, etc.) can be performed according to those of ordinary skill in the art. Examples of techniques and tools for calibration are described in U.S. Pat. No. 9,693,748, and co-pending, co-assigned provisional application No. 63/400,044, filed Aug. 22, 2022, entitled "INTRAPROCEDURE 2D TO 3D REGISTRATION ADJUSTMENT METHOD AND SYSTEM".

The registration between the segmented model and the actual organ coordinates is important because the patient may shift position, orientation, or otherwise move from the position or shape in which the pre-acquired data was obtained. An exemplary system for registering the 3D model to the organ is Lungpoint® and Archimedes® systems both of which are manufactured by Broncus Medical, Inc. (San Jose, CA). Additionally, in some instances, even after registration is performed, further adjustment or correction may be desired. An exemplary system and technique to correct or improve registration is described in co-pending, co-assigned provisional application No. 63/400,044, filed Aug. 22, 2022, entitled "INTRAPROCEDURE 2D TO 3D REGISTRATION ADJUSTMENT METHOD AND SYSTEM"

Device tip computation module 348 is operable to compute the location of the hidden (or buried) device tip in the 3D model of the segmented organ of the patient based on the input information 370 and the output of the other modules described herein. In embodiments, a trained predictive model (e.g., R-CNN) is operable to compute the location of the hidden tip of the instrument based on the camera and fluoroscope images, and output from the above-described modules (e.g., the type and location of features detected in the operative field, as well as feature motion in the operative field). In a preferred embodiment, features are extracted from the detected objects in the operative field (e.g., a lever on the catheter handle to articulate the working tip) and its location is tracked. A motion signature can be computed for each feature being tracked. See, e.g., E. Theodoridou et al., "Hand Tracking and Gesture Recognition by Multiple Contactless Sensors: A Survey," in IEEE Transactions on Human-Machine Systems, 2022.

The inputs are provided to the device-trained model. In the case of a neural network model, the input layer can include, for example, the unburied visible scope length, the scope control lever motion over time (namely, the scope-lever motion signature), the handle rotation over time based on tracking a hub over time (namely, the handle-hub motion signature), the surgeon hand motion over time (namely, the hand motion signature), specifications arising from the model number and marker, patient anatomy including mouth, or insertion point of the bronchoscope, etc.

Optionally, input information can include the 3D position information of the external arranged visible-light and fluoroscope cameras, as well as the patient table or board.

Additionally, in embodiments, when a surgical device is advanced through the bronchoscope, the surgical device tip position or other location on the device is computed based on the bronchoscope tip position, and features detected and tracked on the surgical device including unburied length of the shaft extending from the catheter port in the bronchoscope, the number of markers detected from the distal end of the bronchoscope, the rotation and motion features tracked of the handle present on the surgical device, and the specification arising from the model and model number of the surgical device.

Additionally, the device tip computation (DTC) module may apply a number of logic rules to enhance detection-location accuracy. In embodiments, for example, the computer is operable to process the images from each camera for reliability and adjusts the weight of the data based on the camera's reliability. Examples of logic rules to weight or bias the data include, without limitation:

(a) Weight. Evaluate which camera image contains the greatest number of tool markers, and weight this camera higher than the others. For example, one camera may detect one (1) marker and another camera may detect three (3) markers. The logic rule and computer weight the 3-marker camera higher than the camera detecting fewer operative field markers.

(b) Dynamic. Dynamic or iterative requirement where the computer continuously evaluates the image data obtained from all the cameras. The computer evaluates the data for the camera detecting the most markers, and then identifies this camera as the most reliable and uses its data (or weights its data the highest). This rule serves to continuously change or update which camera is being relied upon to provide the data for tip-location detection.

(c) Unobstructed/Least limitations. As described above, the operative field may have a number of obstacles including obstacles arising from workers or equipment. Embodiments of the invention address such circumstances by providing multiple cameras to monitor the operative field, and to select the camera with the fewest limitations, obstacles or stated alternatively, to select the camera(s) having the most data or features. Once the camera is selected, the image data is fed into the corresponding model to compute the device tip location.

(d) Transpose to Common Reference. In embodiments, the image data from each of the cameras is transposed to a common view for evaluation of the markers, devices and motion. For example, in embodiments, each camera view is transposed to a top view, looking down on the operating table as shown in FIG. 1, and the detection and classification models are performed on the common transformed top-view data. This has the advantage of requiring training of the model from only the top view. However, in other embodiments, a plurality of views is obtained, and detection and classification are performed on one or more of the plurality of views.

The logic rules above are not meant to be exclusive to one another. For example, the image data from each camera may be evaluated. The camera image(s) deemed to be the most reliable is transposed to the common view for detection and classification. As the procedure progresses, the camera deemed to be most reliable may change or be updated. In this manner, the selected image data used for detection, classification, tracking, and ultimately to compute the device tip location is continuously being updated.

Additionally, in embodiments, the user can refine the model. In embodiments, for example, the user (e.g., physician 12 and co-pilot 13) registers/syncs the location of the bronchoscope or device with a landmark or otherwise known anatomical feature in the lung of the patient during the live procedure. Several points can be synced as the user advances the bronchoscope or device along the planned route. Each synced point can act as a breadcrumb to assist the model. In embodiments, each synced point is used as input to the model to limit the model to a specific region of the lung, serving to increase the accuracy and/or speed of finding a solution as the device is further advanced into the lung, and perhaps into an unknown space.

State Machine

Workstation 310 is also shown having a state machine 350 operable to keep track/record the state of the system at all times. The state of all objects, classification, location and movement, 3D tip locations of the surgical device and scope, etc. is all maintained for the procedure for the patient by the state machine Training The device tip computation model is trained on multiple datasets. A procedure is performed with a bronchoscope and surgical device, and the position of the bronchoscope and surgical device are determined using alternative means such as via fluoroscopy, electromagnetic field or tracking tools, or other means known in the art. The input layer and known output are provided to train the model and adjust the parameters of the model, and to optimize the accuracy of the model. Individual components of the device can be imaged in the operative field and the system trained in advance by creating a device location computation model or device location detection file for each type of device. In embodiments, the training images of the individual components of the device may be pre-processed to a common perspective view (e.g., top view) allowing training to be performed from the common perspective view instead of from each different camera view. These location models or files can be created and shared across systems to enable an on-demand library of location detection files or trained models for predicting the device location for each different type of device.

Descriptions of various types of models and methods for training models to register an image from one image modality with that of another can be found in, for example, U.S. Pat. No. 10,529,088 to Fine, filed Dec. 17, 2017, incorporated herein by reference in its entirety for all purposes.

Figure 4:
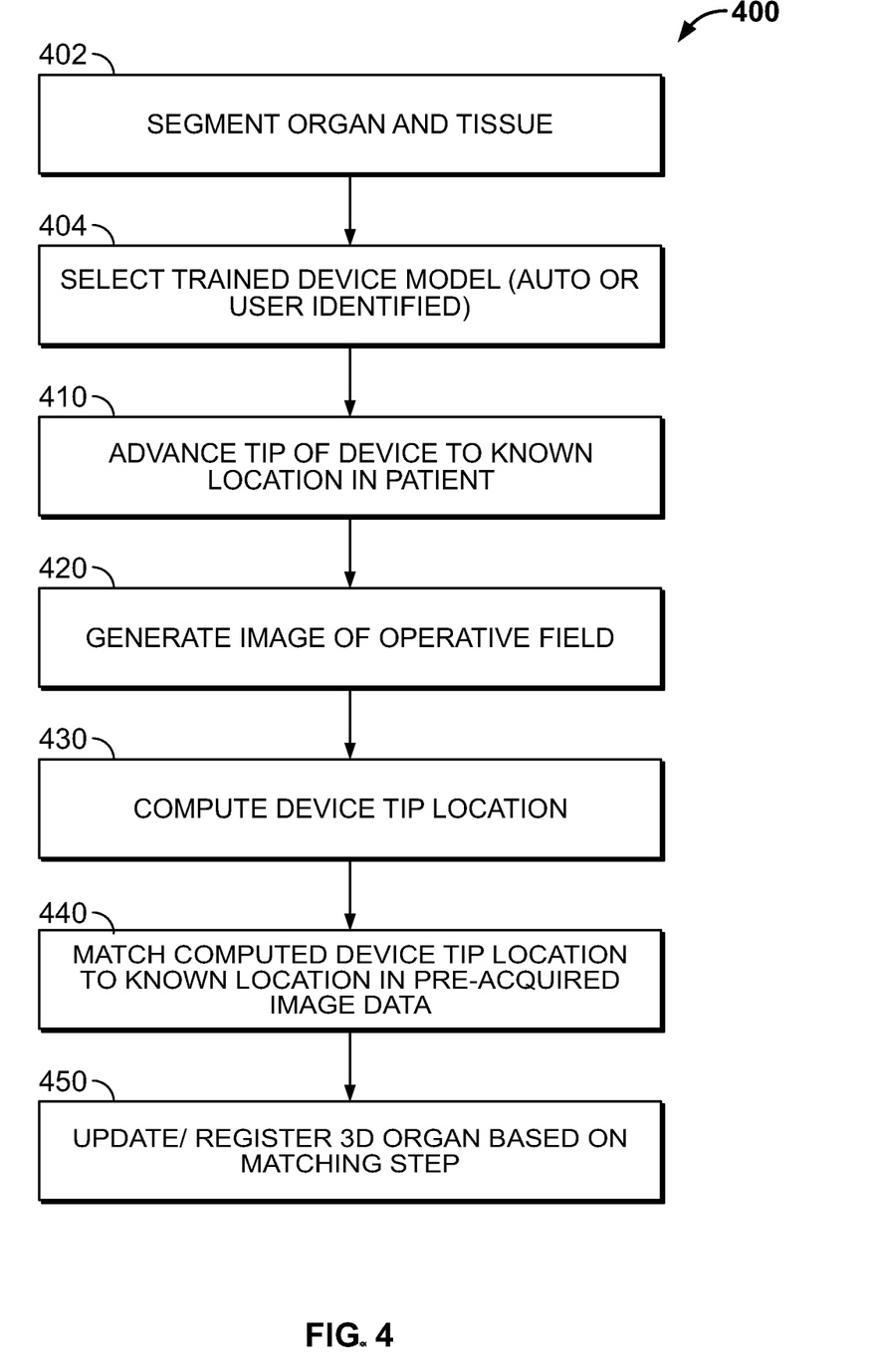
FIG. 4 is a flow chart of calibrating a trained model with the patient for a bronchoscopic procedure in accordance with an embodiment of the invention.

FIG. 4 is a flow chart illustrating a registration method 400 in accordance with an embodiment of the invention. Registration between the 3D model and the live patient is desirable for each patient for each procedure because of patient shift or movement, orientation, or camera shift or relocation.

Step 402 states to segment the organ and target tissue based on the pre-acquired 3D image data. The output from this step is a 3D model of the organ and target tissue. This step may be performed as described above.

Step 404 states to select a trained model. This step may be performed as described above in which one trained model for location computation is selected by the user or automatically. For example, in embodiments, the user may input the type of device and model number into the system (e.g., by manually typing in the model, scanning a bar code, etc.). Step 404 then selects the applicable trained computation model based on the device and model number. In another embodiment, the system is trained to automatically detect the type of device and model number using, for example, radio frequency identification (RFID) technology where the system includes an antenna that can wirelessly detect an RFID on the device. Once the type of device and model is known, the step 404 selects the applicable trained computation model from a library of trained models in memory.

Step 410 states to advance the tip of bronchoscope or surgical device to a known location in patient. For example, the tip of the bronchoscope may be advanced to the main carina. Additional registration steps could include touching known parts of the bronchoscope or surgical device to a known location on the patient. For example, one could touch the bronchoscope handle to the patient's nose or touch a detection marker on the surgical tool to a detection marker on patient.

Step 420 states to generate images (e.g., RGB images) of the operative field showing the visible and unhidden features described above. Optionally, fluoro and/or bronchoscope images may be generated.

Step 430 states to compute a candidate device tip or desired feature location based on the features determined from the images of the operative field. For example, the hidden candidate device tip location is computed based on the features determined from the images of the operative field, and modules described above. Optionally, features from the fluoro and/or scope images can also be used to compute the candidate device tip location.

Step 440 states to match or register the computed hidden candidate device tip location (e.g., a 3D point in a world coordinate reference frame) to the known location in the pre-acquired image data. The difference or error in position is computed. New patient/procedure specific model parameters are computed that cause the computed device tip location to match the actual or known device tip location.

Step 450 states to update the 3D organ and target tissue model of the patient based on the matching step. The 3D organ and target tissue model are, perhaps deformed, to match the actual organ and target tissue geometry based on this registration process.

The process is preferably repeated for multiple locations at different times during the breathing cycle to register the 3D image data with the real time model of the organ of the patient. Additional registration techniques are described in U.S. Pat. No. 9,265,468 to Rai.

The updated registered 3D model is then used to compute the 3D location of the scope and optionally one or more surgical devices, discussed herein.

Figure 5:
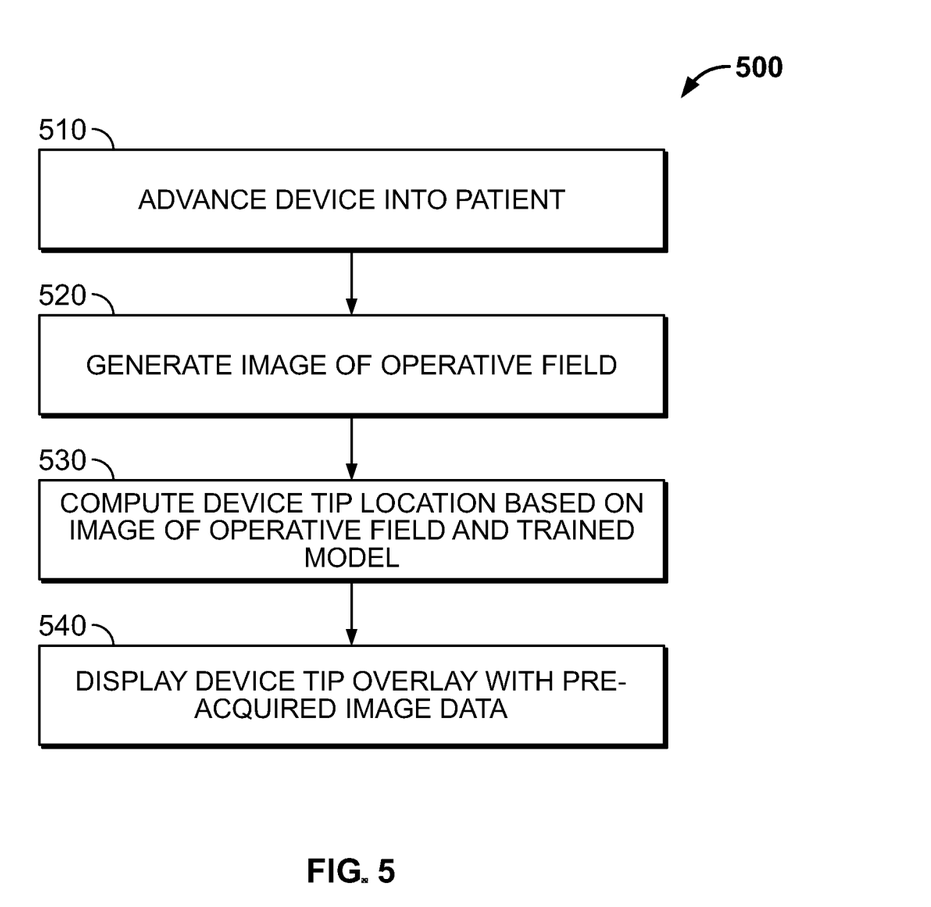
FIG. 5 is a flow chart for computing the 3D location of the hidden working end of a surgical device in a body organ during a live procedure based on images of the operative field in accordance with an embodiment of the invention.

FIG. 5 is a flow chart illustrating a bronchoscopy assistance method 500 based on images of the operative field in accordance with an embodiment of the invention.

Step 510 states to advance the device into the patient. For example, a physician may advance the bronchoscope into the patient until several inches of the shaft of the scope are hidden from view.

Step 520 states to generate images (e.g., RGB images) of the operative field showing the visible and unhidden features described above. Optionally, the images are transposed to a common perspective view and weighted as described above.

Step 530 states to compute the device tip location based on the features detected, classified, and tracked in the images of the operative field, as well as other input information, and the modules described above.

Step 540 states to display the device tip and the pre-acquired image data. Preferably, a 3D representation of the device tip is overlaid or virtually added to an image or depiction of the segmented organ (e.g., the airways) and region of interest or target tissue. The fusion of the device tip and the organ can be performed by an image fusion module (e.g., 352 of FIG. 3) that is operable to compute in a 2D fluoro view (or 3D virtual view) the location of the device tip and to display the anatomy and the device in a single fused image. For example, each of the organ and device tip are transformed to a single world coordinate frame of reference, a view selected by the user, and a corresponding image may be computed showing the organ and device in a fused arrangement. In embodiments, the user can adjust the degree of transparency of the device or the organ and region interest. Additional user tools include an object selection tool, measurement tool, zoom, scroll and save features, etc.

The display step could vary widely. For example, the live bronchoscopic view could be augmented to show a region of interest within the 3D space of the lung superimposed on the bronchoscopic view. Alternatively, the live fluoroscopic view could be displayed with the tip location of the device superimposed on the bronchoscopic view in addition to the region of interest.

In embodiments, methods and systems provide the tip location computation of multiple different devices in a procedure including, for example, the bronchoscope and a surgical device advanced through the working channel of the bronchoscope and advanced outside of the bronchoscope, and optionally outside of the airway. The surgical device may be located and displayed outside of the airway in accordance with embodiments of the present invention disclosed herein. In a preferred embodiment, the location of the surgical device is computed based on the images of the operative field. This has the advantage of locating the position of surgical tools not visible to the imaging modalities within the body (e.g., a radio translucent device in the fluoroscopic view).

Other modifications and variations can be made to the disclosed embodiments without departing from the subject invention.

For example, in embodiments, the invention comprises determining location of the medical device in percutaneous-type surgeries and applications that do not require use of a scope. In the case of a transthoracic procedure, for example, in which a needle is inserted into the lung space, the needle may be located similar to the methods described above using information from the operative field in combination with select fluoro shots to confirm, sync, or calibrate the location of the device with a known location of the patient anatomy.

Optionally, the invention further includes locating an ablation tool advanced through the transthoracic aspiration needle in addition to locating the aspiration needle tip. To assist computing the location, the ablation tool may comprise markings on its shaft indicating axial and rotational position (e.g., symmetric graduations for length, and/or non-symmetrical for rotation determination). The ablation tool location can be computed based on the operative field images, graduations on the shaft, and other features as described above. A model, preferably a machine learning model can be trained similar to that described above for the bronchoscope-assisted applications to predict tip location.

In embodiments, live fluoro scans are minimized, reduced or eliminated because the operative field information suffices to locate the medical device. However, for physicians that desire a second or redundant location confirmation of position of the medical device, CT scans are available to confirm positions. However, it is to be appreciated that the use of the present invention serves to reduce the number of scans and radiation on the patient, a highly desirable benefit.

I claim:

1. A system for assisting a physician compute the 3D location of a tip of a surgical device inserted into an organ of a patient comprising:
   a plurality of cameras arranged outside of the patient to obtain operative-field image data; and
   a processor programmed and operable to compute the 3D location of the device tip based on the operative-field image data; and
   wherein the processor is further programmed and operable to evaluate and weight operative-field image data of each of the plurality of cameras for reliability, and to base the 3D location computation on the weighted operative-field image data; and
   wherein evaluating and weighting the operative-field image data of each of the plurality of cameras for reliability comprises determining (a) the number of objects present in each camera's FOV, (b) the number of markers present in each camera's FOV, (c) the number of features present in each camera's FOV, and/or (d) the unobstructed area of objects in each camera's FOV.

2. The system as recited in claim 1, further comprising a detection module and classification module for, respectively, detecting and classifying objects in the operative field.

3. The system as recited in claim 2, wherein the objects are selected from the group comprising a bronchoscope, the surgical device, markers applied to the patient, bronchoscope or surgical device, patient and physician's anatomy.

4. The system as recited in claim 3, wherein the processor is operable to extract features from the objects, and the 3D location computation is based on the evaluating the extracted features from the objects.

5. The system as recited in claim 4, wherein the processor is further programmed and operable to compute a motion signature based on tracking one the extracted features over time, and the 3D location computation is based on evaluating the motion signature.

6. The system as recited in claim 5, wherein the object is an ablation device, and the feature is a portion of a handle of the ablation device.

7. The system as recited in claim 4, wherein the 3D location computation is further based on user input.

8. The system as recited in claim 4, further comprising an external camera tracking sensor for computing the location of the cameras, and wherein the 3D location computation is further based on tracking the location of the plurality of cameras during the procedure.

9. The system of claim 1, wherein one or more of the plurality of cameras are visible light spectrum cameras.

10. The system as recited in claim 1, wherein the 3D location computation is further based on live fluoroscopic image data and tracking the location of the fluoroscopic camera.

11. The system as recited in claim 1, further comprising a library of prior device data comprising a plurality of different device profiles, and wherein the 3D location computation is based on a device profile from the library.

12. The system as recited in claim 2, wherein the processor is further programmed and operable to transpose the operative field image data to a common perspective view prior to the detecting.

13. A method for assisting a physician perform a medical procedure on a patient with tracking and guidance of a medical device comprises:
advancing at least portion of the medical device into an organ of the patient;
locating a hidden portion of the medical device in the organ of the patient based on live camera images of the operative field; and,
prior to the locating, selecting a device-trained model from a library of different device-trained models based on the type of medical device being advanced into the organ of the patient.

14. The method as recited in claim 13, wherein the step of locating comprises locating a tip of a bronchoscope, and locating a portion of a medical device advanced through the bronchoscope.

15. The method as recited in claim 13, wherein the locating is based on at least one visible marker applied to an unburied portion of the medical device, anatomy of the patient, or anatomy of the physician.

16. The method as recited in claim 13, further comprising extracting at least one feature from the object, and computing a motion signature of the extracted feature based on tracking the extracted feature over time, and wherein the locating step is based on the motion signature.

17. A method for assisting a physician perform a medical procedure on a patient with tracking and guidance of a medical device comprises:
locating a hidden portion of the medical device in an organ of the patient based on live camera images of the operative field; and
evaluating and weighting operative-field image data of each of the plurality of cameras for reliability, and basing the locating on the weighted operative-field image data, and wherein the evaluating and weighting operative-field image data of each of the plurality of cameras for reliability comprises determining (a) the number of objects present in each camera's FOV, (b) the number of markers present in each camera's FOV, (c) the number of features present in each camera's FOV, and/or (d) the unobstructed area of objects in each camera's FOV.

18. The method as recited in claim 17, wherein the step of locating comprises locating a tip of a bronchoscope, and locating a portion of a medical device advanced through the bronchoscope.

19. The method as recited in claim 17, wherein the locating is based on at least one visible marker applied to an unburied portion of the medical device, anatomy of the patient, or anatomy of the physician.

* * * * *